US009454530B2

(12) United States Patent
Sabah et al.

(10) Patent No.: US 9,454,530 B2
(45) Date of Patent: Sep. 27, 2016

(54) RELATIONSHIP-BASED SEARCH AND RECOMMENDATIONS

(71) Applicant: NETFLIX Inc., Los Gatos, CA (US)

(72) Inventors: Mohammad Sabah, San Jose, CA (US); Carlos Gomez-Uribe, Mountain View, CA (US); Vijay Bharadwaj, Belmont, CA (US); Sasi Parthasarathy, Santa Clara, CA (US); Siddharth Angrish, San Jose, CA (US)

(73) Assignee: NETFLIX, Inc., Los Gatos, CA (US)

( * ) Notice: Subject to any disclaimer, the term of this patent is extended or adjusted under 35 U.S.C. 154(b) by 798 days.

(21) Appl. No.: 13/644,548

(22) Filed: Oct. 4, 2012

(65) Prior Publication Data

US 2014/0101192 A1    Apr. 10, 2014

(51) Int. Cl.
*G06F 7/00* (2006.01)
*G06F 17/30* (2006.01)

(52) U.S. Cl.
CPC .............................. *G06F 17/30029* (2013.01)

(58) Field of Classification Search
None
See application file for complete search history.

(56) References Cited

U.S. PATENT DOCUMENTS

| 8,271,334 | B1* | 9/2012 | Funk et al. ................. 705/14.73 |
| 8,589,385 | B2* | 11/2013 | Taylor ..................... H04L 67/02 707/722 |
| 2006/0041548 | A1* | 2/2006 | Parsons et al. .................... 707/5 |
| 2006/0212931 | A1* | 9/2006 | Shull ........................ G06F 21/55 726/10 |
| 2007/0112840 | A1* | 5/2007 | Carson .................. G06Q 10/04 |
| 2007/0156767 | A1 | 7/2007 | Hoang et al. |
| 2008/0052371 | A1* | 2/2008 | Partovi et al. ................. 709/217 |
| 2008/0140644 | A1 | 6/2008 | Franks et al. |
| 2008/0189232 | A1 | 8/2008 | Dunning et al. |
| 2009/0281988 | A1* | 11/2009 | Yoo .................... G06F 17/30867 |
| 2009/0313227 | A1 | 12/2009 | Dunning et al. |
| 2010/0030764 | A1 | 2/2010 | Koren |
| 2011/0125763 | A1* | 5/2011 | Takanen ........... G06F 17/30979 707/749 |
| 2011/0264673 | A1* | 10/2011 | White ............... G06F 17/30867 707/750 |

(Continued)

FOREIGN PATENT DOCUMENTS

| CA | 2829359 A1 | 4/2014 |
| WO | WO 2006067652 A2 * | 6/2006 |

OTHER PUBLICATIONS

European Extended Search Report for EP Application No. 13187429.9, dated Jan. 2, 2014.

(Continued)

*Primary Examiner* — Debbie Le
*Assistant Examiner* — Hasanul Mobin
(74) *Attorney, Agent, or Firm* — Artegis Law Group, LLP

(57) ABSTRACT

Techniques are described for determining relationships between user activities and determining search results and content recommendations based on the relationships. A plays-related-to-searches application may determine a relationship score between plays of a media title and searches of a query by determining a distance between a projection of the search onto the space of the users and a projection of plays of the media title onto the space of the users. A plays-after-searches application may determine a score for plays of the streaming media title given the search by multiplying a number of times plays of the media title occur after the query is entered by the number of times any play occurs, and dividing by a product of the number of times plays of the media title occur after any query is entered and the number of times plays of any media title occur after the query is entered.

24 Claims, 9 Drawing Sheets

(56) References Cited

U.S. PATENT DOCUMENTS

2011/0302155 A1   12/2011  Yan et al.
2014/0095495 A1*   4/2014  Brukman .......... G06F 17/30867
                                                          707/732
2014/0101142 A1    4/2014  Gomez Uribe et al.

OTHER PUBLICATIONS

European Search Report; European Application No. 13187434.9; Dated Dec. 20, 2013.

* cited by examiner

RELATIONSHIP-BASED SEARCH AND RECOMMENDATIONS

TECHNICAL FIELD

Embodiments presented in this disclosure generally relate to computer software. More specifically, embodiments presented herein relate to techniques for generating search results and content recommendations based on relationships between user activities.

BACKGROUND

A streaming media service generally includes a content server, a content player, and a communications network connecting the content server to the content player. The content server is configured to store (or provide access to) media files (or "streams") made available to end users. Each stream may provide a digital version of a feature length film, a television programs, a sporting event, a staged or live event captured by recorded video, and the like. Streams also include media content created specifically for distribution online. Media playback by a client device is typically referred as "streaming" because the content server transmits portions of a media file to the client device, which in turn decodes and initiates playback without waiting for the complete stream to be received.

To locate content to stream, a user may perform a "search" of media files available on the content server. In response to receiving a search query, the content server may determine a collection of streaming media titles (also referred to herein as "media titles") relevant to the search query and serve to the client device a webpage containing links which can be clicked to access one or more of the streaming media titles. One approach for generating search results is to rank media titles based on exact and fuzzy matches of user-entered query text with the text of titles, synopses, cast, etc. of media titles. However, this approach often provides unsatisfactory results for non-title, non-actor, and non-genre-specific queries such as "funny movies" or "new releases" for which the results of text matches to the titles, synopses, cast, etc. of media titles may not meet user expectations. Further, where users search for media titles that are not available on the content server, returning available media titles based on partial query text matches may not be particularly unhelpful.

BRIEF DESCRIPTION OF THE DRAWINGS

So that the manner in which the above-recited features of the present disclosure can be understood in detail, a more particular description of the disclosure may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OVERVIEW

Figure 1:
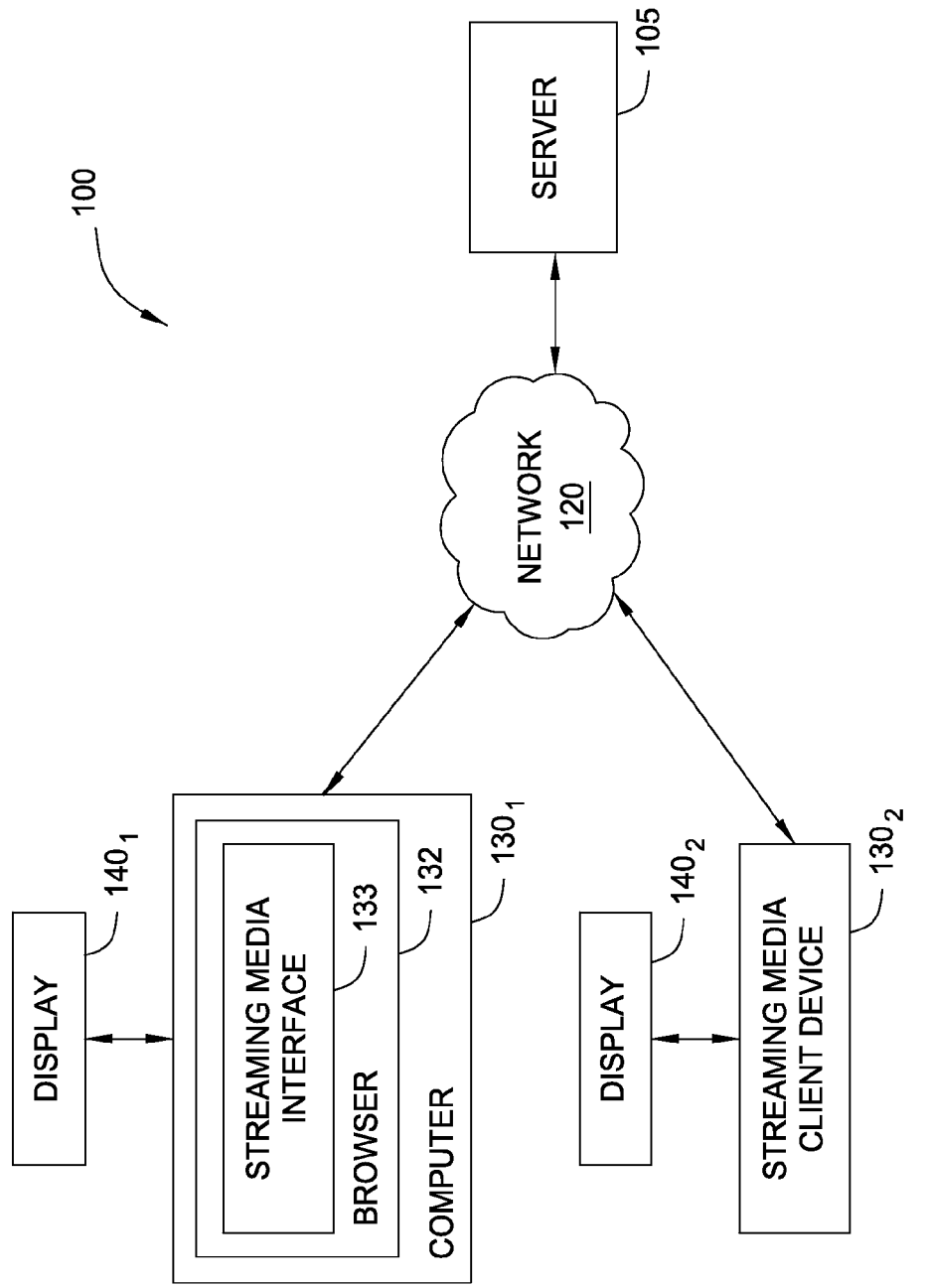
FIG. 1 illustrates an example computing infrastructure used to provide streaming media to a variety of client systems, according to one embodiment of the invention.

Embodiments of the invention provide techniques for determining relationships between user activities. One embodiment of the invention includes a method for determining search results based on non-causal relationships between user activities. The method includes receiving data relating to occurrences of instances of a first and a second user activity and determining, from the data, projections of the instances of the first user activity onto a space of the users and projections of the instances of the second user activity onto the space of the users. The method further includes determining relationship scores between each of the instances of the first user activity and each of the instances of the second user activity based on distances between the respective projections of the instances of the first user activity onto the space of the users and the respective projections of the instances of the second user activity onto the space of the users. In addition, the method includes determining one of search results and content recommendations based at least on the relationship scores and causing the one of search results and content recommendations to be presented to a user.

Other embodiments include a computer-readable medium that includes instructions that enable a processing unit to implement one or more aspects of the disclosed methods as well as a system configured to implement one or more aspects of the disclosed methods.

Description of Example Embodiments

Embodiments of the invention provide techniques for determining relationships between user activities. Such relationships may be quantified as relationship scores. And the relationship scores may be used to determine or improve search results and content recommendations, thereby permitting users to, e.g., find and view content which is more relevant to their tastes. In one embodiment, the activities may include playing of a streaming media title and searches related to same. In such a case, a plays-related-to-search (PRS) application may determine a non-causal relationship score between the plays of a given streaming media title and a given search query at least in part by determining a distance between (1) a projection of the search query onto the space of the users and (2) a projection of plays of the streaming media title onto the space of the users. The distance may be, e.g., a cosine of the angle between the projections. In context, a "play" of the given streaming media data may be based on, e.g, any portion of the title being streamed or the length of time the title is streamed. Further, assuming that each user are separate and independent from one another, relationship scores for multiple media titles and queries pairs may be calculated in parallel. In addition, the relationship scores may be corrected for popularity and availability of titles.

In another embodiment, in which the activities include plays of streaming media titles and searches relating to the same, a plays-after-search (PAS) application may determine four values for a given media title and search query pair: (1) the number of times plays of the media title occur after the query is entered; (2) a total number of times plays of the media title occur after any query is entered; (3) a total number of times plays of any media title occur after the query is entered; and (4) a total number of times any play of any media title occurs. Using these four values, the PAS application may determine a causal relationship score for plays of the media title given the search query at least in part by taking the product of the number of times plays of the media title occur after the query is entered and the total number of times any play of any media title occurs, and further dividing such a product by the product of the total number of times plays of any media title occur after the query is entered and the total number of times the media title is played after any query. In lieu of the number of times the media title is played, the number of times the media title is played for at least a given duration, the total number of minutes the media content is played, and the like may be used as an alternative. In yet another embodiment, the score may be adjusted to account for the amount of data available based on, e.g., a statistical confidence bound.

Given a search query, the foregoing relationship scores determined by the PRS and the PAS applications may be used alone, or in combination, to generate search results, media content recommendations, and the like which are relevant to the search query. In one embodiment, the relationship scores discussed above may be included in a weighted sum which also includes other media title relevancy scores to improve the search results for the search query. In another embodiment, the scores can be used to generate media recommendations outside of the context of the search experience and based on the search queries the user enters and the associated media items with high PAS score.

Note, the following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas are not described in detail herein.

FIG. 1 illustrates an example computing infrastructure 100 used to provide streaming media content to client systems $130_{1-2}$, according to one embodiment. As shown, the computing infrastructure 100 includes a streaming media server system 105 and client systems $130_1$, $130_2$, each connected to a communications network 120.

The client systems $130_{1-2}$ communicate with the streaming media server system 105 over the network 120 to download streaming media titles. In this particular example, client system $130_1$ represents a computer system running a web-browser 132. Accordingly, client system $130_1$ is representative of desktop PCs, laptop computers, home-theater PCs (HTPCs), tablet computers, mobile telephones, and other computing systems capable of running a web-browser. The web-browser 132 is configured to obtain a streaming media interface 133 from the streaming media server 105, rendered on a display $140_1$, e.g., an LCD monitor.

Streaming media server 105 provides a computing system configured to transmit media streams (or links to media streams) to clients $130_{1-2}$. For example, streaming media server 105 may include a web-server, database, and application server configured to respond to requests for web pages and/or streaming media files received from web-browser 132. The content itself may be distributed from the streaming media server 105 or through broader content distribution networks. For example, in one embodiment, the streaming media server 105 may allow users to authenticate themselves to the streaming media provider (e.g., using a username and password). Once a given user is authenticated, the user may search for media titles by, e.g., entering text queries, and in response to receiving such queries, the streaming media server 105 may use relationships between user activities to generate a set of titles and serve the set of titles to the user's client device. Here, the set of titles may include search results, media title recommendations, "top 10" lists, and the like. The set of titles may be transmitted to the interface 133 as a set of links (e.g., HTTP URLs) to streaming media content available from the media server 105 (or related content distribution network). Logic included in the streaming media interface 133 may then begin downloading and playback for one of the titles accessed by one of the links. In addition to generating the set of media titles, the streaming media server 105 may also use relationships between user activities to generate other content, such as related search recommendations, to present on the client system 130.

Client system $130_2$ represents a set-top device connected to both network 120 and a display 140 (e.g., a flat-panel television). Accordingly, client system $130_2$ is representative of digital cable boxes, digital video recorder (DVR) systems, video game consoles, and other streaming media devices, as well as DVD players capable of connecting to a network 120 and receiving and playing back media streams provided by media server 105. For example, some Blu-ray® disc players can download and execute BD-live applications. In such a case, the disc player could connect to the media server 105 and download interface components used to select and playback media streams. Further, display 140 may itself be an integrated device capable of connecting to the network 120 playing back media streams supplied by the media server 105. For example, some flat-panel television displays include integrated components used to connect to a streaming media service, video on demand services, or video sharing websites.

Figure 2:
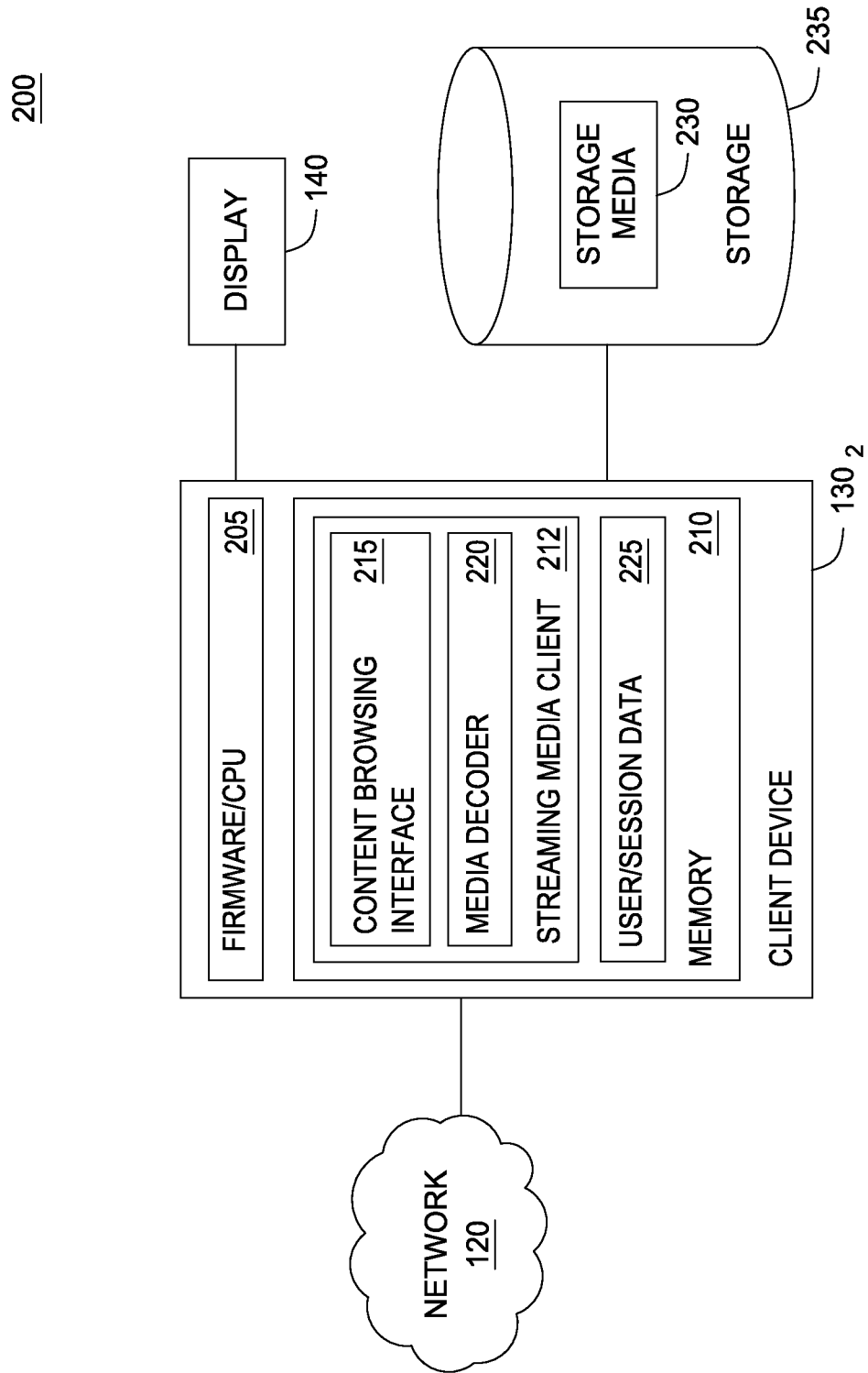
FIG. 2 illustrates an example client device used to enter search queries and to view streaming media content, according to one embodiment of the invention.

FIG. 2 illustrates an example of a client device $130_2$ used to view streaming media content, according to one embodiment. In this example, a streaming media client device is connected to both a display screen (e.g., a flat panel television) and a network. Accordingly, as shown, the client device $130_2$ is connected to both a network 120 and to a display 140. Note, client device $130_2$ is included to be representative of a cable-set top box, a digital video recorder (DVR), or television with integrated streaming functionality, as well as dedicated streaming devices (e.g., a Roku® device) connected to a television display. However configured, the client device $130_2$ may be capable of streaming media content from a variety of different service providers. Client device $130_2$ is also shown connected to a storage repository 235 of stored media 230, representing locally stored content that is available for playback on display 140.

In one embodiment, the client device $130_2$ is configured to allow users to view media content streamed over network 120 using a content browsing interface 215. As shown, the client device $130_2$ includes firmware 205, memory 210, and storage 235. The firmware 205 represents operating logic used to control the client device $130_2$. For example, the firmware 205 may be configured to allow users to schedule recordings, connect to streaming media services, select content for playback, etc. Content retrieved over the network 120 may be buffered in storage 235 prior to being decoded and presented on display 140.

Illustratively, the memory 210 includes user/session data 215 and a media client 212, which itself includes a media decoder 220 and a content browsing interface 215. The streaming media client 212 provides software on the client device $130_2$ used to access a given streaming media service. And the media decoder 220 is generally configured to decode and generate display frames from data streamed over the network 120, whether as part of content browsing interface 215 or otherwise. In one embodiment, the content browsing interface 215 be configured to connect to a streaming media service, authenticate itself, e.g., using credentials entered by a user or stored as part of user/session data 225, and allow a user to select content to view on display 140.

Figure 3:
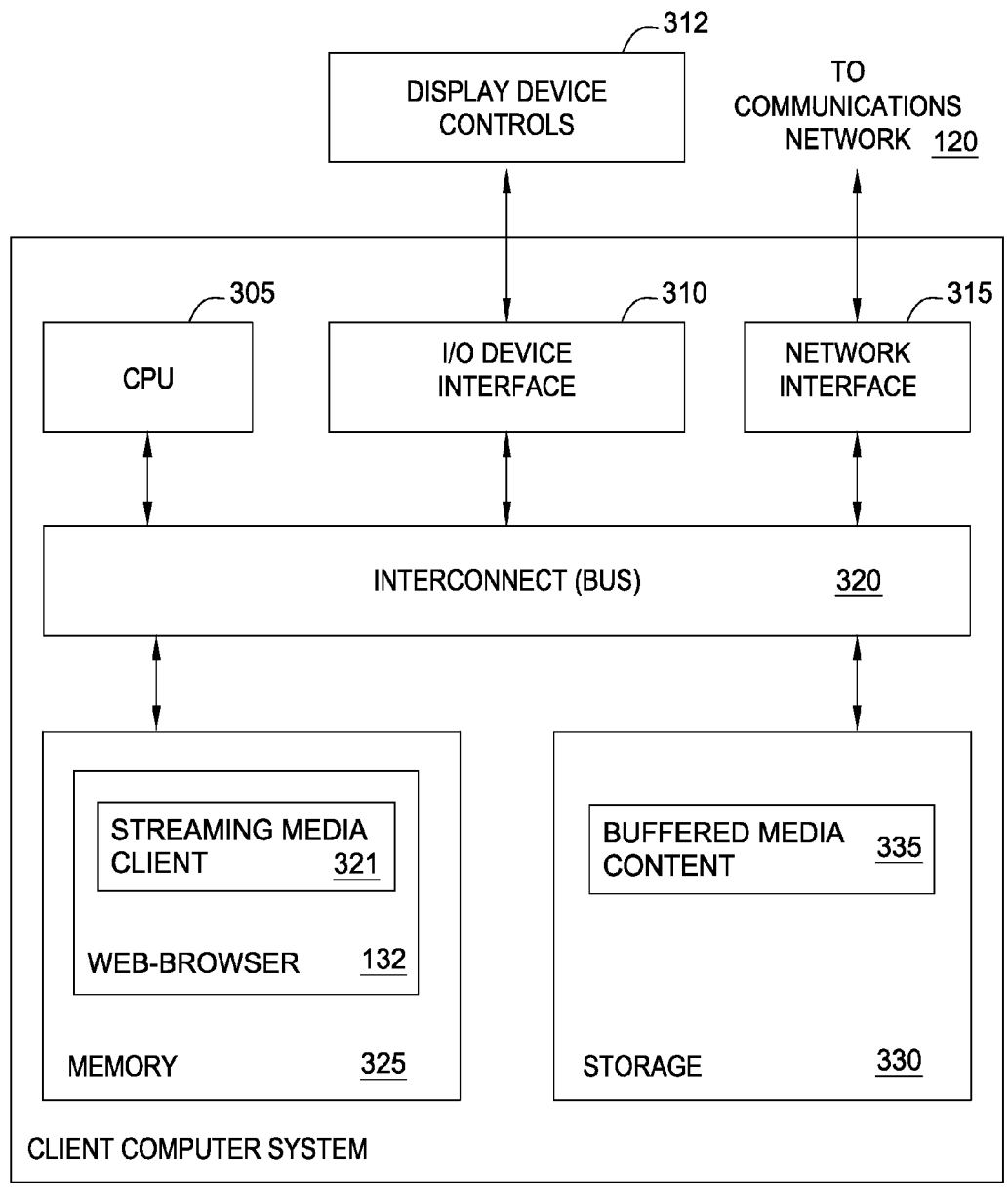
FIG. 3 illustrates an example computing system used to view streaming media content, according to one embodiment of the invention.

FIG. 3 illustrates an example of a client computing system $130_1$ used to view streaming media content, according to one embodiment. As shown, the client computing system $130_1$ includes, without limitation, a central processing unit (CPU) 305, a network interface 315, a bus 320, a memory 325, and storage 330. The computing system $130_1$ also includes an I/O device interface 310 connecting I/O devices 312 to the computing system $130_1$ (e.g., a keyboard, mouse, or remote control, along with a monitor (e.g., an LCD panel)).

CPU 305 is included to be representative of a single CPU, multiple CPUs, a single CPU having multiple processing cores, etc., and the memory 325 is included to be representative of a random access memory. The bus 320 connects CPU 305, I/O devices interface 310, storage 330, network interface 315, and memory 325. The network interface 315 is configured to transmit data via the communications network 120, e.g., to stream media from the server system 105. Storage 330, such as a hard disk drive or solid-state (SSD) storage drive, may store audio video data files along with other content.

Illustratively, the memory 325 includes a web browser 132, which itself includes a streaming media client 321, and the storage 330 stores buffered media content 335. The browser 132 provides a software application which allows a user to access web pages and other content hosted by a server. In particular, the browser 132 may permit the user enter search queries for transmission to the server via the network 120. The streaming media client 321 generally corresponds to software components retrieved from a streaming media service in order to playback media content from that streaming media service. Content downloaded from the streaming media service may be stored in storage 330 as buffered media content 335 prior to being decoded and played back by streaming media client 321.

Figure 4:
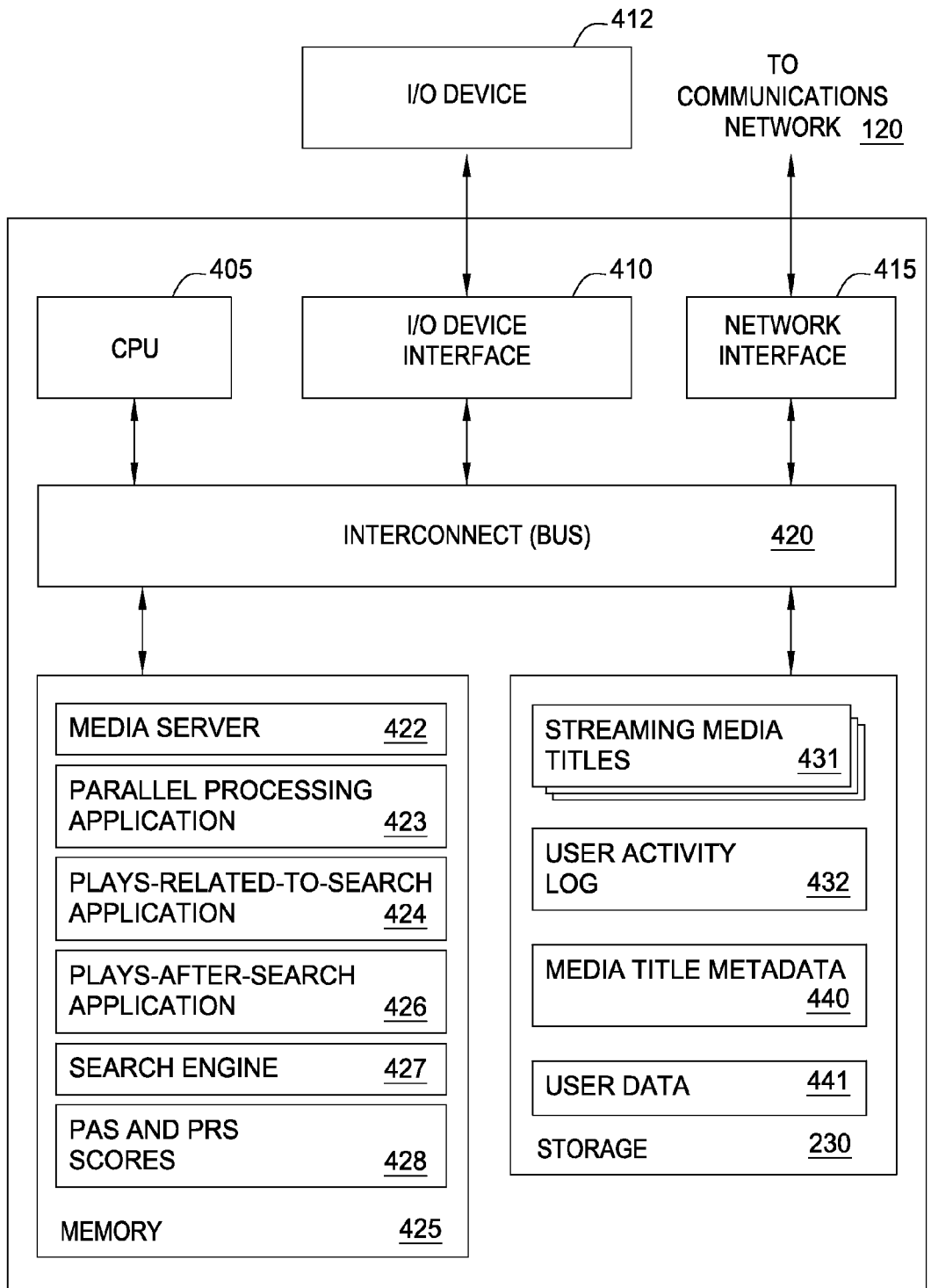
FIG. 4 illustrates an example computing system used to provide a streaming media server and activity relationship-based search and recommendations, according to one embodiment of the invention.

FIG. 4 illustrates an example computing system used to provide a streaming media server 105, according to one embodiment. As shown, the server 105 includes, without limitation, a central processing unit (CPU) 405, a network interface 415, a bus 420, a memory 425, and storage 430. The content server system 105 also includes an I/O device interface 410 to devices 412 (e.g., keyboard, display and mouse devices).

CPU 405 retrieves and executes programming instructions stored in the memory 425. Similarly, CPU 405 stores and retrieves application data residing in the memory 425. The bus 420 is used to transmit programming instructions and application data between the CPU 405, I/O devices interface 410, storage 430, network interface 415, and memory 425. CPU 405 is included to be representative of a single CPU, multiple CPUs, a single CPU having multiple processing cores, and the like. And the memory 425 is generally included to be representative of a random access memory. The storage 430 may be a disk drive storage device. Although shown as a single unit, the storage 430 may be a combination of fixed and/or removable storage devices, such as magnetic disc drives, solid state drives (SSD), removable memory cards, optical storage, network attached storage (NAS), or a storage area-network (SAN).

Illustratively, the memory 425 includes a media server 421 which serves streaming media titles to client devices. Storage 230 includes streaming media titles 231, a user activity log 432, and media title metadata 440. Streaming media titles 231 provide a library of media content available for streaming. Accordingly, the streaming media titles 321 may include a collection of audio/video data encoded at various bitrates and stored on the content server system 105. Alternatively, the streaming media titles 231 may include metadata describing the actual media files, which may be made available from a content distribution network. In such a case, the media server 221 may be configured to, e.g., generate a license used by a client to obtain a given streaming media title from the content distribution network.

User activity log 432 is representative of one or more log files which store user/session data, including data relating to activities undertaken by users. Such activities may include, e.g., viewing a media title, performing a search, clicking on links, and the like. Thus, log entries may include, e.g.: (1) a user ID, an ID of a media title played by the user, a timestamp of when the play started, and a timestamp of when the play ended; and (2) a user ID, text of a search query entered by the user, and a timestamp of when the search query was received. As shown, storage 230 also includes user data 441. User data 411 may include user IDs of each user subscribing to the streaming media service, and may also include usernames, password data, and other user information. In addition, storage 230 also includes media title metadata 440, may which include media title rollups, whether media titles are available at various times, and other information relating to media titles. As discussed in greater detail below, the user activity log 432, media title metadata 440, and user data 441 may be used to identify causal and non-causal relationships between user activities. For example, the user activity log 432, media title metadata 440, and user data 441 may be used to determine plays-related-to-search (PRS) and plays-after-search (PAS) scores based on relationships between media titles and searches of queries. The PRS and PAS scores may then be used, either alone or in combination with other scores, to generate search results, media title recommendations, and the like.

As shown, the memory 425 also includes a plays-related-to-search application 424 which determines a relationship score between plays of a given media title and searches of a given query based on observations of plays of the media title and searches of the query recorded in the user activity log 432, without regard to causality. That is, without regard for whether search(es) preceding plays of a title led to the plays of the title. In one embodiment, the PRS application 424 may determine such relationship scores according to one or more of methods 500 and 600, discussed below. In addition, the memory 425 includes a plays-after-search application 426 which determines a relationship score between plays of media titles and search queries based on observations (recorded in the user activity log 432) of plays of the media titles which occurred after the search queries were entered.

Note, in contrast to the non-causal relationship scores determined by the PRS application 424, the scores determined by the PAS application attempt to account for causality. In one embodiment, the PAS may determine such relationship scores according to method 700, discussed below. In addition to the PRS and PAS applications 424, 426, the memory 425 may also include other applications (not shown) for determination causal or non-causal relationships between various user activities. In one embodiment, causal relationships may be determined by performing steps similar to those of method 700. On the other hand, non-causal relationships may be determined in one embodiment by performing steps similar to those of methods 500 and/or 600.

As shown, the PRS and PAS scores 428 generated by the PRS application 424 and the PAS application 426, respectively, are stored in the memory 425. Other relationship scores relating user activities, discussed above, may also be stored in the memory 425. The PRS, PAS, and other scores may have a number of useful applications. For example, the PRS, PAS, and other scores may be used to generate search results; "related searches" recommendations; media title recommendations; "top 10" lists; clusters of related searches, media titles, or users; and the like. As shown, the memory 425 includes a search engine 427 configured to generate search results based on PRS and PAS scores. In one embodiment, the search engine 427 may generate such results according to method 800, discussed below. In alternative embodiments, the search engine 427 (or another application) may also generate the "related searches" recommendations, media title recommendations, etc. discussed above using one or more of the PRS, PAS, and other scores.

Illustratively, the memory 425 also includes a parallel processing application 423. As discussed in greater detail below, parallel processing may be used to compute at least the PRS scores. In one embodiment, parallel processing application 423 may be a Map Reduce application, e.g., running on the Apache™ Hadoop™ framework. Although depicted as a single physical server 105, the server 105 is also representative of multiple physical servers (e.g., a server cluster), and the parallel processing application 423 may run across those multiple servers to provide distributed and scalable computing.

Plays-Related-to-Searches Scores

As discussed, a plays-related-to-search (PRS) application may determine a relationship score between plays of a media title and searches of a query based on observations of plays of the media title and searches of the query, without regard to causality (i.e., without assuming search(es) preceding plays of a title led to plays of the title). The relationship scores may themselves be used to determine or improve search results and content recommendations, thereby permitting users to, e.g., find and view content which is more relevant to their tastes.

Figure 5:
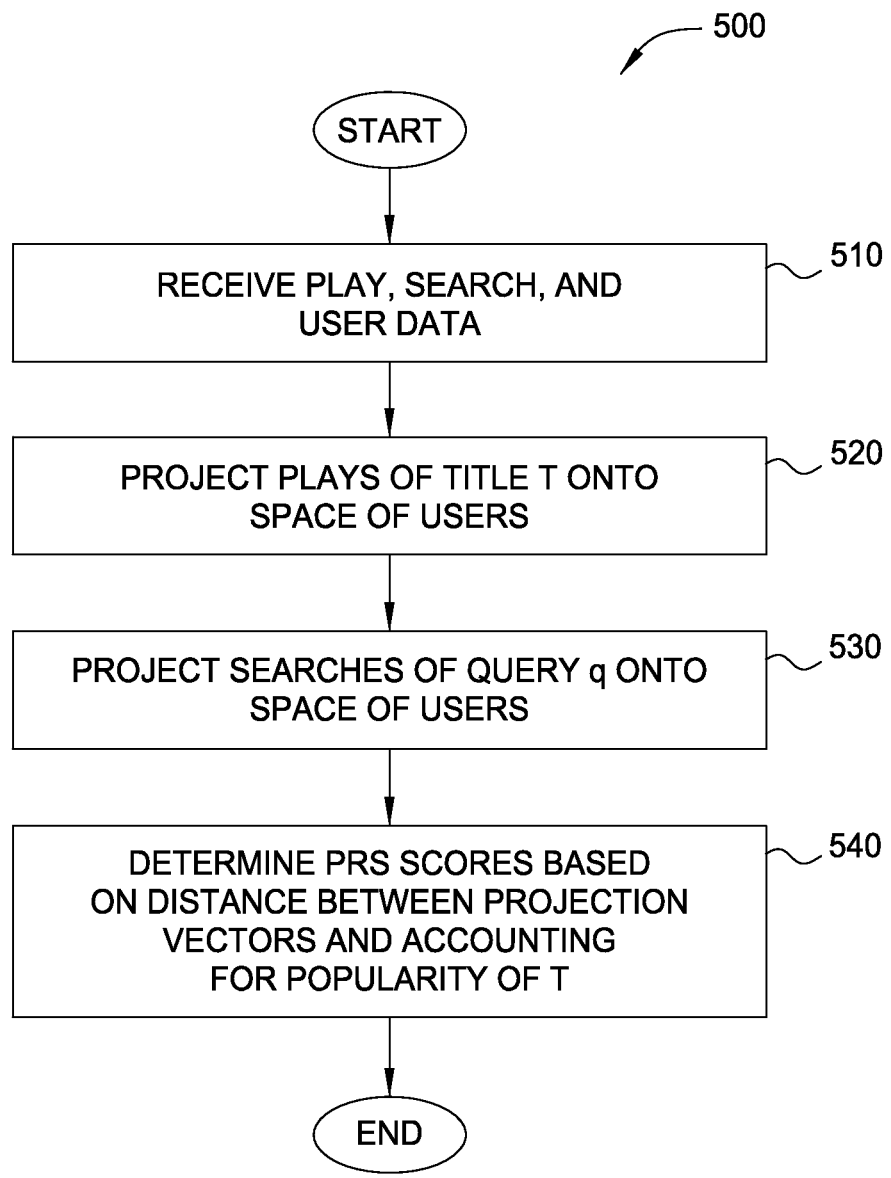
FIG. 5 illustrates a method for determining a plays-related-to-searches scores, according to one embodiment of the invention.

FIG. 5 illustrates a method 500 for determining plays-related-to-searches (PRS) scores, according to one embodiment. As shown, the method 500 begins at step 510 where a PRS application receives play, search, and user data. Such data may include, for example, (1) user IDs, titles (or IDs) of media content played by the users, and timestamps of when those titles were played; (2) user IDs, text of search queries entered by the users, and timestamps of when those searches were entered; and (3) user IDs of all users who are registered to stream media content and perform searches. In one embodiment, the play, search, and user data may span a given time duration (e.g., months). Further, the media title may be a stand-alone media content item (e.g., an episode of a show) or a roll-up of stand-alone media content items (e.g., a media title representing seasons of a series or a complete series). In one embodiment, the PRS application may also convert data received relating to individual media titles to data for rolled-up media titles to, e.g., determine the relationship between a search query and plays of any episode of a series.

At step 520, the PRS application projects, for a given media title T, plays of title T onto the space of all users. That is, the PRS application constructs a vector $S_T$, where $$S_T[i] = \begin{cases} 1 \text{ if user } i \text{ played title } T \\ 0 \text{ otherwise.} \end{cases}$$

Here, the length of vector $S_T$ is N, the total number of users. At step 530, the PRS application projects, for a given search query q, searches of query q onto the space of all users, producing a vector $S_q$, where $$S_q[i] = \begin{cases} 1 \text{ if user } i \text{ entered query } q \\ 0 \text{ otherwise.} \end{cases}$$

Similar to vector $S_T$, vector $S_q$ has length N equal to the total number of users.

At step 540, the PRS application determines the PRS score of media title T for query q based on a cosine distance between vectors $S_T$ and $S_q$ while accounting for popularity of title T. In one embodiment, the PRS score R may be calculated as $$R_{T,q} = \cos(\theta) \cdot \frac{1}{(\log\|S_T\|)^\gamma} = \frac{S_T \cdot S_q}{\|S_T\|\|S_q\|} \times \frac{1}{(\log\|S_T\|)^\gamma} = \frac{\sum_{i=1}^n S_{T_i} \times S_{q_i}}{\sqrt{\sum_{i=1}^n (S_{T_i})^2} \times \sqrt{\sum_{i=1}^n (S_{q_i})^2}} \times \frac{1}{\left(\log\sqrt{\sum_{i=1}^n (S_{T_i})^2}\right)^\gamma}.$$

Here, the numerator of the cosine term is the dot product between vectors $S_T$ and $S_q$, while the denominator of the cosine term is the product of the Euclidean norms of the vectors $S_T$ and $S_q$, respectively. The $$\frac{1}{(\log\|S_T\|)^\gamma}$$

term corrects for popularity of media content items by dividing by log of the Euclidean norm of $S_T$ to power $\gamma$. Without correcting for popularity, popular titles which many users have played may have high relevancy scores across all search queries, despite many searches for particular queries being unrelated to plays of the popular title. At the same time, experience has shown that simply dividing by the Euclidean norm of $S_T$ overcompensates for popularity, producing scores which tend to favor unpopular titles too much. Dividing by $(\log\|S_T\|)^\gamma$ may alleviate such overcompensation. Here, the particular value of the exponent $\gamma$ may be experimentally-determined, and may generally vary across, e.g., different sets of users with different preferences.

As discussed in greater detail below, PRS scores may be used, either alone or in combination with other scores (e.g., PAS scores), to generate, e.g., search results in response to a user's query. In response to receiving a search query entered by a user, a search engine may determine weighted sums of PRS and other scores for media titles available on the server and order the titles based on the weighted sums. The server may then serve to the user's client device a search results webpage which includes a list of links to one or more of the titles, in order.

Figure 6:
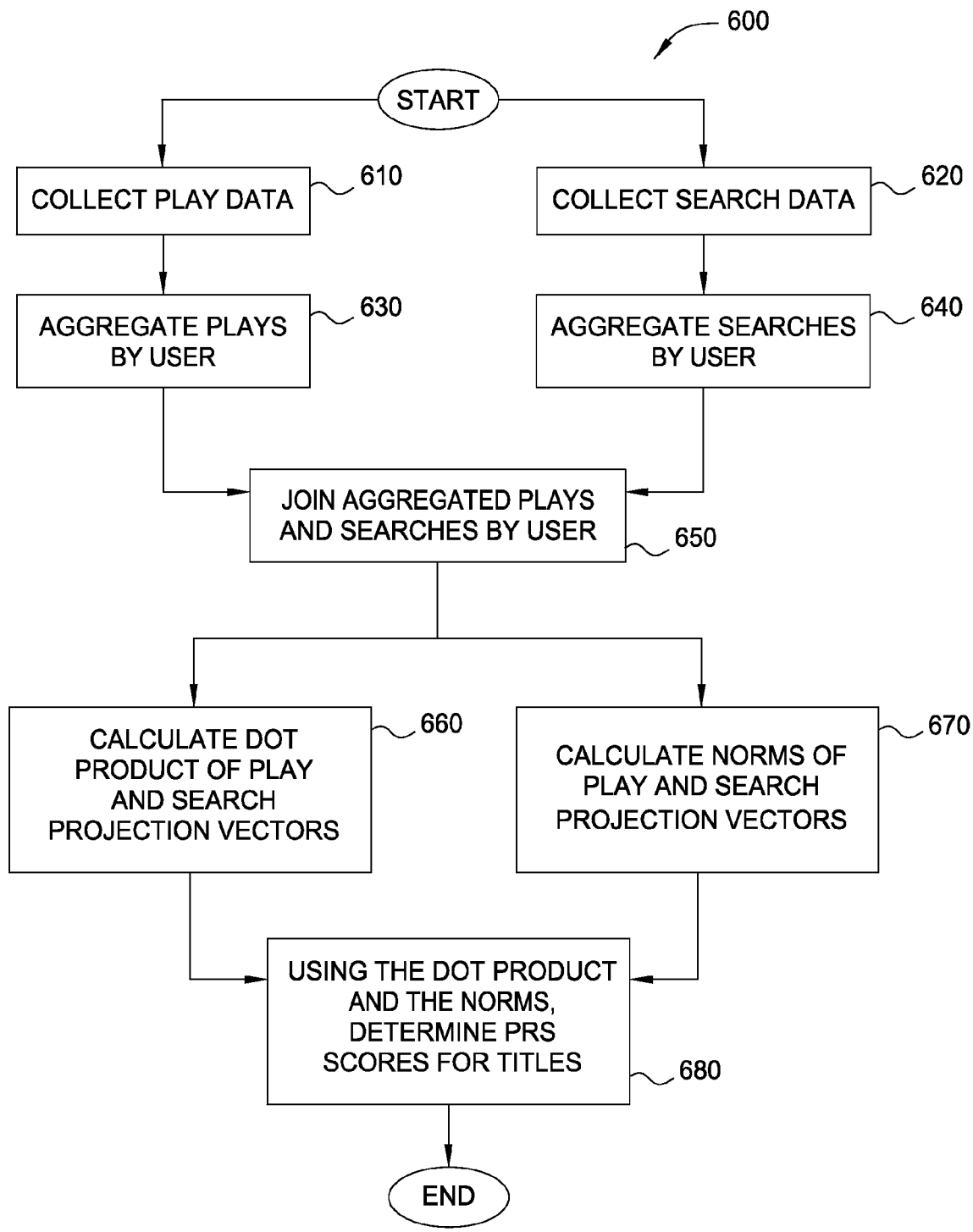
FIG. 6 illustrates a method for determining plays-related-to-searches scores using parallel processing, according to one embodiment.

FIG. 6 illustrates a method 600 for determining PRS scores using parallel processing, according to one embodiment. Use of parallel processing may permit PRS scores to be calculated in less time than would otherwise be required. The calculated PRS scores may then be stored in memory and used, e.g., to generate search results, recommendations, etc. which are served to a user's client device.

As shown, the method 600 begins at steps 610 and 620, where a logging application collects data about media content played and searches performed, respectively. As discussed, play data collected at step 610 may include, e.g., user IDs, titles of media content played by users and timestamps of when those titles were played. Similarly, the search data collected at step 620 may include, e.g., user IDs, text of search queries, and timestamps of when those queries were entered. For example, for each play and search by a user, the logging application may add to a log file (or a plurality of log files) an entry having a user ID, an ID of the media title played or text of the search query, and a timestamp for when the search query was received or timestamps for when play of the media title started and ended.

At steps 630 and 640, a PRS application aggregates plays and searches, respectively, by user. More specifically, at step 630, the PRS application generates tuples $u_T=\{u \rightarrow T_1:t_1, T_2:t_2, \ldots\}$ for each user u, where $t_1$, $t_2$, etc. are timestamps indicating when user u played media titles $T_1$, $T_2$, etc., respectively. Note, the per-user tuples may include one or more timestamps $t_i$ for each title $T_i$, or no timestamps at all. Similarly, at step 640, the PRS application generates tuples $u_q=\{u \rightarrow q1:t1', q2:t2' \ldots\}$ for each user u, where t1', t2', etc. are timestamps indicating when user u entered searches which included queries $q_1$, $q_2$, etc., respectively. In general, the search queries entered and media titles played by any given user may be independent of the queries and plays of other users. As a result, the tuples $U_T$ and $u_q$ for multiple users may be constructed in parallel.

In one embodiment, the PRS application may generate tuples $U_T$ and $u_q$ using MapReduce. MapReduce is a programming model for performing parallel computations over, e.g., large data sets. In MapReduce, the Map operation processes a <key, value> pair to generate a set of intermediate <key, value> pairs according to a user-specified Map function, and the Reduce operation combines elements of the intermediate values which are associated with the same intermediate keys according to a user-specified Reduce function. In order to generate tuples $u_T$ and $u_q$, a Map function may take the log as input and emit intermediate <key, value> pairs <user ID, $T_i:t_i$> and <user ID, $q_2:t_2$'>. Then, the Reduce function may aggregate the <user ID, $T_i:t_i$> and <user ID, $q_2:t_2$'> pairs based on the user ID keys and emit <key, value> pairs <user ID,$\{T_1:t_1, T_2:t_2, \ldots\}$> and <user ID,$\{q_1: q_2:t_2', \ldots\}$>.

At step 650, the PRS application joins the aggregated play and search tuples. That is, the PRS application generates, for each user u, tuples $u_T=\{u \rightarrow T_1:t_1, T_2:t_2, \ldots \| q_1:t_1', q_2:t_2', \ldots\}$ which include values from both $u_T$ and $u_q$. Joining aggregated plays and searches may be performed in parallel. In MapReduce, the PRS application may perform, e.g., a reduce-side join, with the join key being the user ID. Here, the Map function may be the identity function taking as input <key, value> pairs <user ID,$\{T_1:t_1, T_2:t_2,\}$> and <user ID,$\{q_1: q_2:t_2', \ldots\}$> determined at steps 630-640 and emit intermediate <key, value> pairs < user ID, $\{T_1:t_1, T_2:t_2, \ldots\}$> and <user ID,$\{q_1:t_1', q_2:t_2', \ldots\}$>. The Reduce function may join the intermediate <key, value> pairs by the same user ID and emit <key, value> pairs <user ID,$\{T_1:t_1, T_2:t_2, \ldots |q_1:t_1', q_2:t_2', \ldots\}$>.

At step 660, the PRS application calculates the dot product between vectors $S_T$ and $S_q$, discussed above, using the joined aggregated play and search tuples determined at step 650. The dot product between all $S_T$ and $S_q$ vectors may be calculated in parallel using such tuples. Once again, the dot product calculation may be implemented in one embodiment using MapReduce. For example, the Map function may take as input <key, value> pairs <user ID,$\{T_1:t_1, T_2:t_2, \ldots |q_1:t_1', q_2:t_2', \ldots\}$> and emit intermediate <key, value> pairs <$q_k-T_j$, 1> for each user who has both entered search query $q_k$ and played media title $T_j$. The Reduce function may sum together all counts of "1" having the same "$q_k-T_j$" keys, thereby determining a dot product between $S_{T_j}$ and $S_{q_k}$ for each query $q_k$ and title $T_j$ pair. The Reduce function may then output <key, value> pairs <$q_k-T_j$, $S_{T_j} \cdot S_{q_k}$>.

At step 670, the PRS application calculates the Euclidean norms of the $S_T$ and $S_q$ vectors. Similar to step 660, Euclidean norms $\|S_T\|$ and $vS_q\|$ may be calculated in parallel using the joined aggregated play and search tuples determined at step 650. For example, the $\|S_T\|$ calculation may be implemented using MapReduce by having a Map function emit <key, value> pairs <$T_i$, 1> for each user who has played media title $T_j$. The Reduce function may then sum over counts of "1," which is $(1)^2$, and take the square root of that sum for each title $T_j$. In such a case, the Reduce function may output <key, value> pairs <$T_j$, $\|S_{T_j}\|$>. Similar Map and Reduce functions may be used to generate <key, value> outputs <$q_k$, $\|S_{qk}\|$> for the search query $q_k$.

At step 680, the PRS application uses the dot product determined at step 660 and the norms calculated at step 680 to determine relevancy scores for each media content item. In one embodiment, the relevancy score R may be calculated as $$R_{T,q} = \cos(\theta) \cdot \frac{1}{(\log\|S_T\|)^\gamma} = \frac{S_T \cdot S_q}{\|S_T\|\|S_q\|} \times \frac{1}{(\log\|S_T\|)^\gamma} =$$

$$\frac{\sum_{i=1}^{n} S_{T_i} \times S_{q_i}}{\sqrt{\sum_{i=1}^{n}(S_{T_i})^2} \times \sqrt{\sum_{i=1}^{n}(S_{q_i})^2}} \times \frac{1}{\left(\log\sqrt{\sum_{i=1}^{n}(S_{T_i})^2}\right)^\gamma}.$$

The cosine term of such a relevancy score may be determined by dividing the dot products for each query text-item title pair $q_k$-$T_j$ by the appropriate Euclidean norms $\|S_{T_j}\|$ and $\|S_{q_k}\|$, determined at steps 660 and 670, respectively. Similarly, the value of the Euclidean norm $\|S_{T_j}\|$ determined at step 660 may be plugged into $$\frac{1}{(\log\|S_T\|)^\gamma}$$

to determine a value of the correction term. Calculation of relevancy score R may be performed in parallel for the various query text-item title pairs $q_k$-$T_j$. For example, in MapReduce, the Map function may take as input <key, value> pairs $<T_j\text{-}q_k,\{S_{T_j}\cdot S_{q_k},\|S_{T_j}\|,\|S_{q_k}\|\}>$ and emit intermediate <key, value> pairs $$\left(q_k, \frac{S_{T_j} \cdot S_{q_k}}{\|S_{T_j}\|\|S_{q_k}\|} \times \frac{1}{(\log\|S_T\|)^\gamma}\right).$$

Then, the Reduce function may group together values by key and order the values to emit <key, value> outputs <$q_k$, $\{T_m\!:\!R_{T_m,q_k}, T_n\!:\!R_{T_n,q_k}\ldots\}$>, where $R_{T_m,q_k} > R_{T_n,q_k} > \ldots$ (or, in alternative embodiments, $R_{T_m,q_k} < R_{T_n,q_k} < \ldots$).

Experience has shown that users often play only some titles out of all available titles T and search for only some queries out of all searched queries q. As a result, the matrix {user→query, title} may be sparse (i.e., include many 0 terms). The parallel-processing steps described above exploit such sparseness to compute PRS scores in a computationally efficient manner.

Although discussed above with respect to relevancy scores determined based on a cosine distance between play and search vector projections, alternative embodiments may use other measures of distance. For example, Euclidean distance, statistical correlation, and the like may be used.

Further, although discussed above with respect to the number of plays of titles, an alternative embodiment may account for reward perception (i.e., how positively users feel about titles they play) by using length of plays of titles, number of plays of titles which exceed a predefined duration, the number of episodes of a series watched, and the like. In a further embodiment, a user's play and search may be weighted more (e.g., based on a time decay) where the play occurs in closer temporal proximity to the search, and vice versa. In yet another embodiment, the PRS application may consider only searches which happened within time periods when the particular media title was available, thereby correcting for the unavailability of the title at certain times (i.e., correcting for cases where a title could not be played even if a user searched for the title).

Although discussed above with respect to searches and plays, steps similar to those of methods 500 and 600 may be used to determine relationships between other user activities. In general, relationship scores may be determined for comparing any user activity to any other, or the same, user activity. For example, plays may be compared to plays, searches may be compared to searches, etc. In addition, users may be compared to other users based on their activities. Such scores may in turn be used, either alone or in combination with other scores, to generated "related searches"; media title recommendations; clusters of related searches, media titles, or users; and the like. For example, after a user enters a search query, a search engine may determine one or more related searches based on a search-after-search or search-related-to-search comparison, and the server may include the related search in a webpage served to the user's client device. As another example, the server may determine based on a comparison of plays to plays, whether two or more titles tend to played by the same user. The server may then include a recommendation of a title which tends to be played with a title searched for by a user in a search results webpage served to the user.

Plays-after-Searches Scores

As discussed, a plays-after-search application may determine relationship scores between plays of media titles and search queries based on observations of plays of the media titles which occur after entries of the search queries. The relationship scores may themselves be used to determine or improve search results and content recommendations, thereby permitting users to, e.g., find and view content which is more relevant to their tastes.

Figure 7:
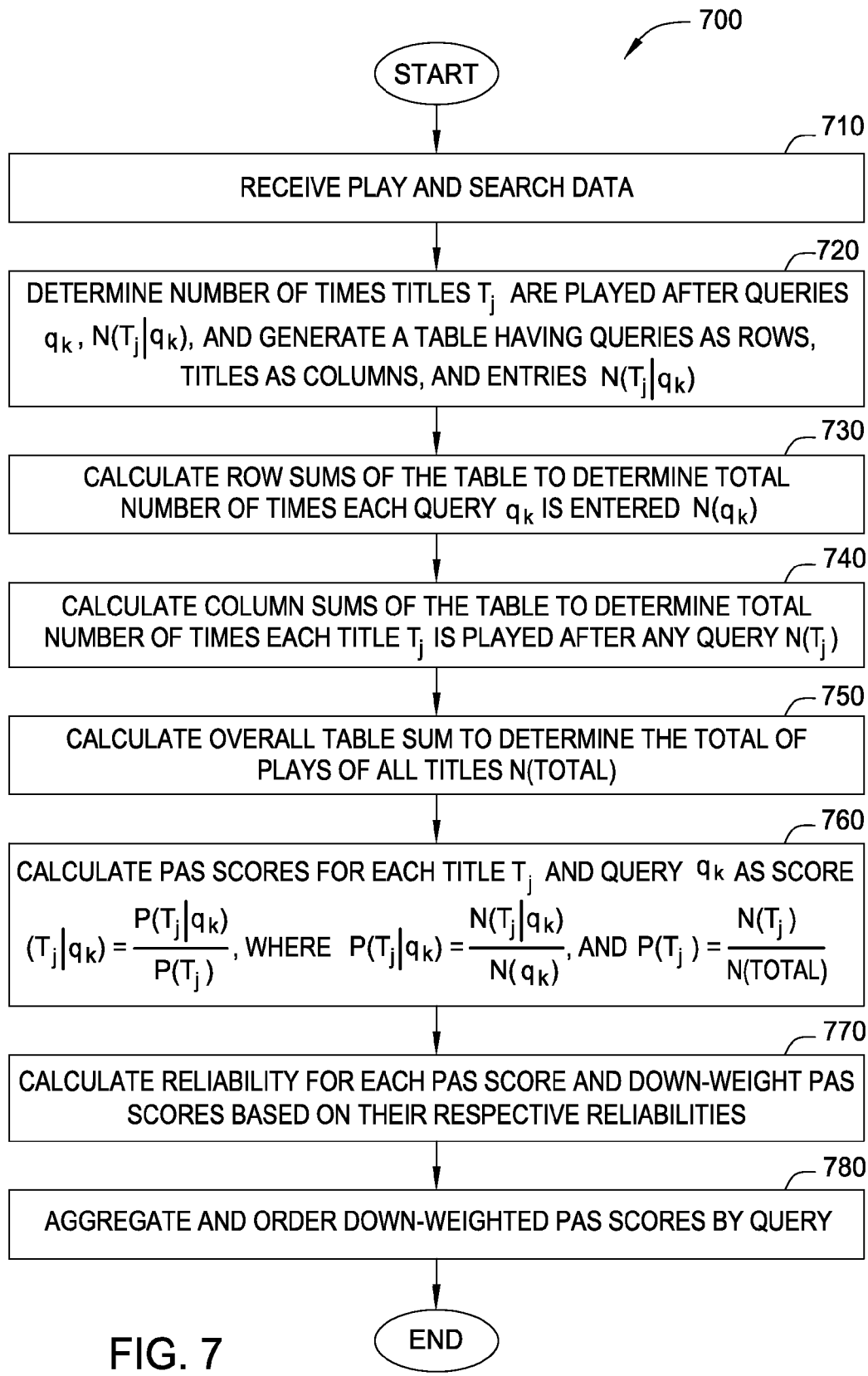
FIG. 7 illustrates a method for determining plays-after-searches scores, according to one embodiment of the invention.

FIG. 7 illustrates a method 700 for determining plays-after-searches (PAS) scores, according to one embodiment. As shown, the method 700 begins at step 710, where a PAS application receives play and search data. Such data may include, for example, (1) user IDs, titles (or IDs) of media content played by the users, and timestamps of when those titles were played; and (2) user IDs, text of search queries entered by the users, and timestamps of when those searches were entered. Additionally, the play and search data may span a given time duration (e.g., one day) to make PAS score computations more tractable.

At step 720, the PAS application determines the number of times titles $T_j$ are played after queries $q_k$, i.e., $N(T_j|q_k)$, and generates a table having queries as rows, titles as columns, and entries $N(T_j|q_k)$. In one embodiment, the values of $N(T_j|q_k)$ may be corrected to account for the time differences between the times when search queries $q_k$ are entered and the times when titles $T_j$ are played, as a play is more likely to be related to a search if the play occurs in closer temporal proximity to the search. For example, $N(T_j|q_k)$ may be corrected based on: a time decay. In another embodiment, the values of $N(T_j|q_k)$ may account for time spent streaming media title $T_j$ after performing search $q_k$, which may indicate how satisfied users were in watching title $T_j$. For example, $N(T_j|q_k)$ may count the total number of minutes title $T_j$ is played after search $q_k$, only count title $T_j$ as being "played" after search $q_k$ if title $T_j$ is streamed by the user for a given number of minutes, and the like. Of course, one or more of the of the foregoing decay correction, count of total number of minutes played, etc. may be calculated and/or combined to suit the needs of a particular case.

At step 730, the PAS application calculates row sums of the table generated at step 720 to determine total numbers of plays of any titles after query $q_k$, denoted by $N(q_k)$. At step 740, the PAS application calculates column sums of the table generated at step 720 to determine total numbers of times titles $T_j$ have been played after any query $N(T_j)$. Then, at step 750, the PAS application calculates an overall table sum to determine the total number plays of all titles N(Total).

At step 760, the PAS application calculates a PAS score for each title $T_j$ and query $q_k$ pair as $$\text{score}(T_j | q_k) = \frac{P(T_j | q_k)}{P(q_k)},$$

where $$P(T_j | q_k) = \frac{N(T_j | q_k)}{N(q_k)}, \text{ and } P(T_j) = \frac{N(T_j)}{N(\text{Total})}.$$

Here, the values of $N(T_j|q_k)$, $N(T_j)$, $N(q_k)$, and N(Total) are those determined at steps 730-750, and the PAS application may simply plug those values into the equations for score $(T_j|q_k)$, $P(T_j|q_k)$, and $P(T_j)$. The denominator $P(q_k)$ is akin to a popularity correction, as using only $P(T_j|q_k)$ biases results toward popular titles with high probabilities of being played irrespective of the queries entered. Dividing by $P(q_k)$ corrects for such a bias and increases the score of actual relevant titles relative to popular titles that are unrelated to the queries entered.

At step 770, the PAS application calculates an error for each score $(T_j|q_k)$ and down-weights each score based on reliability of that score. In general, the reliability of a score$(T_j|q_k)$ increases with an increase in observations (i.e., the number of plays of title $N(T_j)$, plays of any title after a given query $N(q_k)$, and plays after searches $N(T_j|q_k)$), and vice versa. As a result, the signal-to-noise ratio of the score$(T_j|q_k)$ may be improved by modifying the score to account for the number of observations.

In one embodiment, the PAS application determines a lower statistical confidence bound based on the number of observations. For example, the lower confidence bound may be taken as $$lb\left(\frac{P(T_j|q_k)}{P(q_k)}\right) = \frac{P(T_j|q_k)}{P(q_k)} \times \left[1 + \frac{1}{N(q_k)} - 1.96\eta\right],$$

where $$\eta = \sqrt{\frac{1}{N(T_j|q_k)} - \frac{1}{N(q_k)} + \frac{1}{N(T_j)} - \left(\frac{1}{N(T_j)}\right)^2}$$

is a standard deviation for distributions based on $N(T_j|q_k)$, $N(q_k)$, and $N(T_j)$. In a further embodiment, the lower confidence bound lb $$\left(\frac{P(T_j|q_k)}{P(q_k)}\right)$$

may be computed for one or more of the $N(T_j|q_k)$ variants discussed above corrected by a time decay. In yet another embodiment, the PAS application may reject a score$(T_j|q_k)$ if the lower confidence bound for that score is below a threshold value.

At step 780, the PAS application aggregates and orders down-weighted scores score$(T_j|q_k)$ by query. That is, for each query, $q_k$, the PAS application constructs a tuple as follows:

$\{T_m\text{:downweighted score}(T_m|q_k), T_n\text{:downweighted score}(T_n|q_k), \ldots\}$, where downweighted score $(T_m|q_k) >$ downweighted score $(T_n|q_k) > \ldots$, or vice versa. In one embodiment, lower confidence bounds lb $$\left(\frac{P(T_j|q_k)}{P(q_k)}\right)$$

may be computed for one or more of the $N(T_j|q_k)$ variants discussed above corrected by a time decay, and the PAS application may aggregate and order averages of the different lb $$\left(\frac{P(T_j|q_k)}{P(q_k)}\right)$$

values for each $T_j$ and $q_k$ pair.

As discussed in greater detail below, PAS and/or PRS scores may be used, either alone or in combination with other scores to generate, e.g., search results in response to a user's query. In response to receiving a search query entered by a user, a search engine may determine weighted sums of PAS and/or PRS and other scores for media titles available on the server and order the titles based on the weighted sums. The server may then serve to the user's client device a search results webpage which includes a list of links to one or more of the titles, in order.

Although discussed above with respect to searches and plays, steps similar to those of methods 700 may be used to determine causal relationships between other user activities. In general, scores may be determined for comparing any user activity which may follow any other, or the same, user activity. For example, play-after-play, search-after-search, etc. relationship scores may be determined. In addition, users may be compared to other users based on the activities they undertake after other activities. As discussed, such scores may in turn be used, either alone or in combination with other scores, to generated "related searches"; media title recommendations; clusters of related searches, media titles, or users; and the like. For example, after a user enters a search query, a search engine may determine one or more related searches based on a search-after-search or search-related-to-search comparison, and the server may include the related search in a webpage served to the user's client device. As another example, the server may determine based on a comparison of plays to plays, whether two or more titles tend to played by the same user. The server may then include a recommendation of a title which tends to be played with a title searched for by a user in a search results webpage served to the user.

Similar to the discussion above with respect to PRS scores, PAS scores may be generated in parallel given a log of user searches and plays of titles. In one embodiment, the PAS application may be implemented using MapReduce.

Combining Plays-Related-to-Search Scores and Plays-after-Search Scores

As discussed, the PRS, PAS, and other scores relating various user activities may have a number of useful application. For example, the PRS, PAS, and other scores may be used to generate search results; "related searches" recommendations; media title recommendations; "top 10" lists; clusters of related searches, media titles, or users; and the like. When included in webpages served to the users, such search results, recommendations, etc. may improve user experience by, e.g., permitting users to find and watch streaming media titles that they enjoy.

Figure 8:
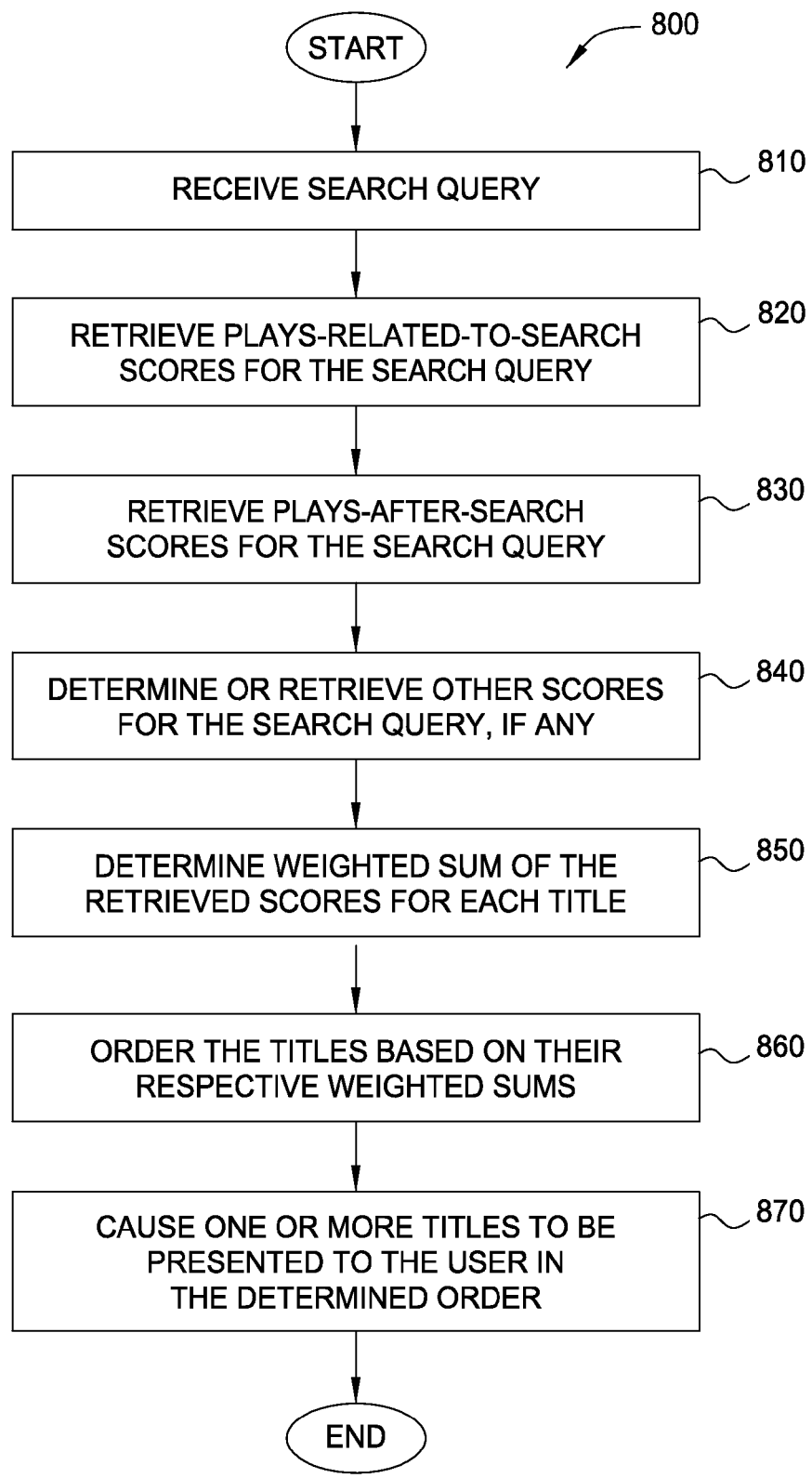
FIG. 8 illustrates a method for generating search results using plays-related-to-searches and plays-after-searches scores, according to one embodiment of the invention.

FIG. 8 illustrates a method 800 for generating search results using PRS and PAS scores, according to one embodiment of the invention. The method 800 begins at step 810, where a search engine receives a search query. For example, a user interacting with a streaming media service using a website may enter the search query. At step 820, the search engine retrieves PRS scores for the search query. Such scores may be generated for each media title by a PRS application according to methods 500 and 600, and stored thereafter for use in processing and responding to user searches for streaming media. In one embodiment, the PRS scores may be normalized to the range [0,1] (if the scores are not already in that range). Such normalization allows the PRS scores to be compared to other scores, such as PAS scores. Note, at step 810, the search engine may fail to find a PRS score for the search query. In such a case, the PRS score may simply be taken as, for example, 0.

At step 830, the search engine retrieves plays—after-search scores for the search query. The PAS scores may be generated for each media title by a PAS application according to method 700 and stored thereafter in system memory.

In addition, the PAS scores may also be normalized to the range [0,1] (if the scores are not already in that range). If the search engine does not find a PAS score for the search query, the PAS score may be taken as, e.g., 0.

At step 840, the search engine determines weighted sums of scores for the media content items using at least the PRS and PAS scores retrieved at steps 820 and 830, respectively. In one embodiment, the PRS and PAS scores may be included in weighted sums. The weighted sums may further include other scores, such as text-match scores, media title popularity scores, query popularity scores (e.g., based on the number of user clicks of media title $T_j$ after entering query $q_k$, and the like. For example, the weighted sum score for query q and media title $T_j$ may be given by $$\text{score}(q,T_j) = W_T T_{Tj} + W_Q Q_{Tj} + W_{PAS} PAS_{Tj} + W_{PRS} PRS_{Tj},$$

where $T_{Tj}$ is a text-match score for title $T_j$; $Q_{Tj}$ is a query popularity score; $PAS_{Tj}$ is the PAS score; $PRS_{Tj}$ is the PRS score; and $W_T$, $W_Q$, $W_{PAS}$, and $W_{PRS}$ are scalar weights.

In one embodiment, the value of the weight $W_{PAS}$ may be greater than that of the weight $W_{PRS}$. Experience has shown that PAS scores tend to be more precise (i.e., to indicate with greater accuracy the actual relationships between particular plays and searches), whereas PRS scores tends to sacrifice some precision for coverage of more observations. For example, PAS scores may have greater relevance where many plays following searches are observed, as the number of observations will improve the reliability of the PAS scores. In contrast, PAS scores become less reliable where, e.g., few plays following searches are observed. In such cases, PRS scores may have greater relevance, because PRS determines relationships between searches and plays without regard to causality and can make use of data other than observations of plays following searches.

In another embodiment, the weights $W_{PAS}$ and $W_{PRS}$ may be initialized to certain values and modified based on click-through rates for a given query. As used herein, "click-through rate" refers to a measure of the number of clicks of links, play buttons, and the like presented in response to receiving a search. Experience has shown that PAS and PRS are less relevant where a search query is directed to, e.g., a specific media title or cast member, and is thus likely to match the text of the media title or cast member. By contrast, PAS and PRS scores become more relevant in cases (1) where the query text is nontitle, non-actor, and non-genre-specific (e.g., "funny movies," "new releases," and the like) and is thus unlikely to directly match text of media titles, synopsis, cast, etc.; and (2) where the user searches for a media title that is not available on the server. In such cases, click-through rates for the queries may be low, as the search results provided for the query may not accord with user expectations. As a result, the search engine may increase the weights $W_{PAS}$ and $W_{PRS}$ relative to the weights $W_T$, $W_Q$ in such cases, thereby increasing the salience of the PAS and PRS scores. For example, the weights $W_{PAS}$ and $W_{PRS}$ may account for click-through rates as follows:

$$W_{PRS} = W_{PRS_0} + 0.8 W_{PRS_0}(1 - CTR_q/100)$$

$$W_{PAS} = W_{PAS_0} + W_{PAS_0}(1 - CTR_q/100),$$

where $W_{PRS_0}$ and $W_{PAS_0}$ are the initial weight vectors for the PRS and PAS scores, respectively, and $CTR_q$ is the percentage click-through rate for search query q.

In an alternative embodiment, the weights $W_T$, $W_Q$, $W_{PAS}$, and $W_{PRS}$ may be dynamically learned using a regression model. For example, the regression model may learn the weights based on user clicks and click-play analysis for each query-title pair.

At step 850, the search engine orders all media titles based on their respective weighted sums as determined at step 840. Then, at step 860, the search engine causes one or more media titles to be presented to the user in the order determined at step 850. For example, the search engine may generate a webpage which includes links to the one or more media titles, the links being ordered such that the media title associated with the highest (or lowest, as the case may be) link appears at the top, and so on. The server may then serve the webpage to the user's client device via a network, and the user may view the webpage using, e.g., a web browser.

Figure 9:
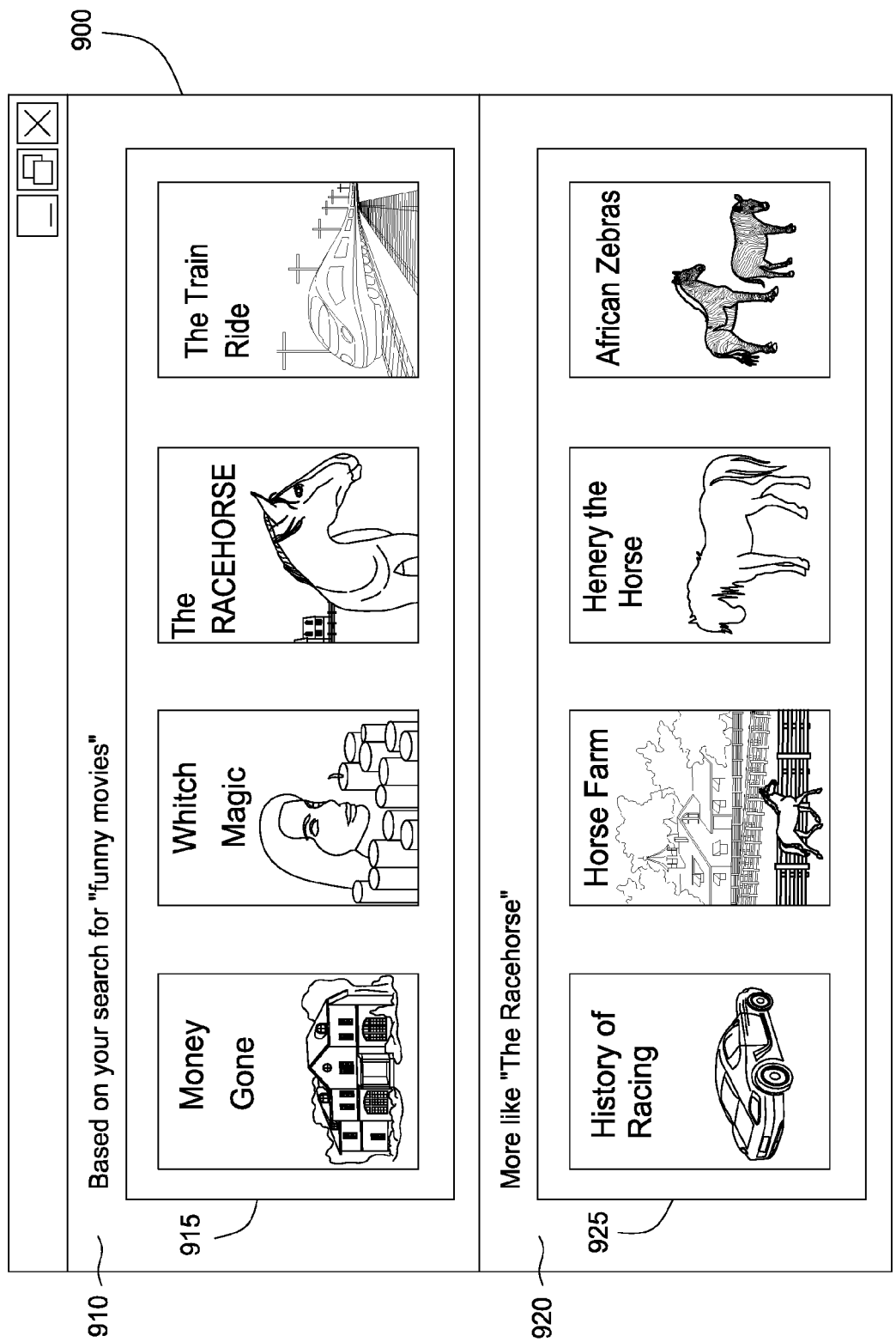
FIG. 9 illustrates an example user interface configuration for presenting recommendations based on searches and recommendations of similar titles, according to one embodiment of the invention.

FIG. 9 illustrates an example user interface 900 configuration for presenting recommendations based on searches and recommendations of similar titles, according to one embodiment. As shown, the user interface 900 includes a "Based on your search for 'funny movies'" recommendation bar 910 which presents recommendations relating to a particular search query ("funny movies"). Further, the recommendation bar 910 itself includes a list of titles 915, shown as icons. Here, the titles appearing in the list of titles 915 may be determined in a manner similar to the method 800 for generating search results using PRS and PAS scores, discussed above. For example, PRS, PAS, and/or other scores (e.g., text-matching scores) relating to the search query may be combined (e.g., in a weighted sum) to generate an overall recommendation score for each available title. The available titles may then be ordered based on their respective overall recommendation scores, and one or more titles which have the highest (or lowest, as the case may be) overall recommendation scores may be selected to be presented in the list of titles 915.

Illustratively, the user interface 900 also includes a "More like 'The Racehorse'" recommendation bar 920 which presents recommendations of titles which are similar to a given title ("The Racehorse"). Similar to the recommendation bar 910, the recommendation bar 920 includes a list of titles 925, shown as icons. Further, PRS, PAS, and/or other scores (e.g., text-matching scores) may be combined (e.g., in a weighted sum) to generate an overall similarity score for each available title, which may then be used to select particular titles for presentation in the list of titles 925. For example, the overall similarity score may be generated (at least in part) based on PAS and PRS scores relating to searches of "The Racehorse" and similar phrases. That is, the overall similarity scores for each available title may account for titles being played after or related to searches of "The Racehorse" and similar phrases, thereby increasing the likelihood that titles which are played more often after, or related to, searches of "The Racehorse" are presented to the user in the list of titles 925. As another example, plays of titles may be compared to plays of other titles to determine causal and non-causal relationships between titles, as discussed above. The strength of such causal and non-causal relationships may then be used in determining which titles are similar to "The Racehorse" and should be presented in the list of titles 925.

Advantageously, plays-related-to-searches scores are non-causal in that the time sequence of events is not considered. Such an approach permits all play and search observations to be considered, which may be particularly useful where few plays and/or search observations are available. The corrections discussed herein for popularity and availability of media titles, as well as the use of reward perception based on the time length of plays, further improves the resulting plays-related-to-searches scores. Use of parallel processing permits plays-related-to-searches scores to be determined even for large sets of play, search, and user data. In addition, plays-related-to-searches scores may be used to generate, e.g., search results or recommendations for non-title, non-actor, and non-genre-specific queries such as "funny movies" or "new releases," for which text match search results may not meet user expectations, as well as for queries for media titles that are not available on the server.

Plays-after-searches scores are causal in that the time sequence of events is considered, and may be more precise than plays-related-to-searches scores where sufficient observation data is available. By combining plays-after-searches scores with plays-related-to-searches scores, which as discussed is non-causal and sacrifices some precision for greater coverage, the benefits of either or both of precision and coverage may be obtained. Further, use of the conditional probability notion ($T_j|q_k$) automatically corrects for popularity of the title $T_j$ played after query $q_k$. In addition, similar to plays-related-to-searches scores, plays-after-searches scores may be used to generate, e.g., search results or recommendations for nontitle, non-actor, and non-genre-specific queries such as "funny movies," "sex," and "new releases," for which text match search results may not meet user expectations, as well as for queries for media titles that are not available on the server.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A computer-implemented method comprising:
  receiving data relating to occurrences of instances of a first and a second user activity;
  determining from the data, via one or more processors, projections of the instances of the first user activity onto a space of the users;
  determining from the data projections of the instances of the second user activity onto the space of the users;
  determining relationship scores between each of the instances of the first user activity and each of the instances of the second user activity based on distances between the respective projections of the instances of the first user activity onto the space of the users and the respective projections of the instances of the second user activity onto the space of the users;
  determining weighted sum scores for the instances of the first user activity, wherein each weighted sum score includes a product of a weight value and the relationship score corresponding to one or more of the instances of the second user activity, and each weight value is initialized to an initial value and adjusted to decrease with an increase in a number of instances of users performing the first user activity after performing the second user activity;
  determining one of search results and content recommendations based at least on the weighted sum scores; and
  causing the one of search results and content recommendations to be presented to a user.

2. The method of claim 1, wherein each instance of the first user activity includes playing a media title from a set of media titles, and wherein each instance of the second user activity includes entering a distinct search query.

3. The method of claim 2, wherein the distances between the respective projections are measured as cosines of the angles between projections of plays of respective media titles onto the space of the users and projections of searches of queries onto the space of the users.

4. The method of claim 2, wherein at least one of determining projections of plays of media titles onto the space of the users, determining projections of searches of queries onto the space of the users, and determining the relationship scores is performed using parallel processing.

5. The method of claim 4, wherein the parallel processing includes performing at least one of:
  aggregating, by user, plays of media titles;
  aggregating, by user, search queries entered;
  joining by user the aggregated plays of media titles and searches of queries;
  determining dot products of the projections of plays of each of the media titles onto the space of the users with projections of searches of each of the queries onto the space of the users;
  determining norms of each of the projections of plays of the media titles onto the space of the users and norms of each of the projections of searches of the queries onto the space of the users; and
  determining cosines of the angles between the projections of plays of each of the media titles onto the space of the users and the projections of searches of each of the queries onto the space of the users by dividing the respective dot products by the respective norms of projections for each pair of media title and search query pair.

6. The method of claim 2, wherein, for a given search query, the weighted sum scores are determined for each of the media titles of the set of media titles, wherein each weighted sum score includes a product of a weight value and the relationship score corresponding to the given search query, and further comprising ordering the weighted sum scores.

7. The method of claim 6, wherein the weight value is adjusted to decrease with an increase in a click-through rate after search results are presented to users, and vice versa.

8. The method of claim 2, further comprising, correcting the relationship scores based on total numbers of plays of the respective media titles.

9. The method of claim 2, wherein determining projections of searches of queries onto the space of the users excludes queries occurring when the respective media titles were unavailable for viewing by users.

10. The method of claim 1, wherein each instance of the first user activity includes playing a media title from a set of media titles for a period of time, and wherein each instance of the second user activity includes entering a distinct search query.

11. The method of claim 1, wherein each instance of the first user activity and the second user activity include playing respective media titles from a set of media titles.

12. The method of claim 1, wherein each instance of the first user activity and the second user activity include entering respective search queries.

13. A non-transitory computer-readable storage medium storing code for execution by a processor, wherein the code, when executed, performs an operation for providing a viewer with previews of selected titles from a library of streaming media titles, the operation comprising:
receiving data relating to occurrences of instances of a first and a second user activity;
determining from the data, via one or more processors, projections of the instances of the first user activity onto a space of the users;
determining from the data projections of the instances of the second user activity onto the space of the users;
determining relationship scores between each of the instances of the first user activity and each of the instances of the second user activity based on distances between the respective projections of the instances of the first user activity onto the space of the users and the respective projections of the instances of the second user activity onto the space of the users;
determining weighted sum scores for the instances of the first user activity, wherein each weighted sum score includes a product of a weight value and the relationship score corresponding to one or more of the instances of the second user activity, and each weight value is initialized to an initial value and adjusted to decrease with an increase in a number of instances of users performing the first user activity after performing the second user activity;
determining one of search results and content recommendations based at least on the weighted sum scores; and
causing the one of search results and content recommendations to be presented to a user.

14. The computer-readable storage medium of claim 13, wherein each instance of the first user activity includes playing a media title from a set of media titles, and wherein each instance of the second user activity includes entering a distinct search query.

15. The computer-readable storage medium of claim 14, wherein the distances between the respective projections are measured as cosines of the angles between projections of plays of respective media titles onto the space of the users and projections of searches of queries onto the space of the users.

16. The computer-readable storage medium of claim 14, wherein at least one of determining projections of plays of media titles onto the space of the users, determining projections of searches of queries onto the space of the users, and determining the relationship scores is performed using parallel processing.

17. The computer-readable storage medium of claim 14, wherein, for a given search query, the weighted sum scores are determined for each of the media titles of the set of media titles, wherein each weighted sum score includes a product of a weight value and the relationship score corresponding to the given search query, and further comprising ordering the weighted sum scores.

18. The computer-readable storage medium of claim 17, wherein the weight value is adjusted to decrease with an increase in a click-through rate after search results are presented to users, and vice versa.

19. The computer-readable storage medium of claim 14, further comprising, correcting the relationship scores based on total numbers of plays of the respective media titles.

20. A system, comprising:
a memory; and
a processor storing one or more applications, which, when executed on the processor, perform an operation for providing a viewer with previews of selected titles from a library of streaming media titles, the operation comprising:
receiving data relating to occurrences of a first and a second user activity,
determining from the data, via one or more processors, projections of instances of the first user activity onto a space of the users,
determining from the data projections of instances of the second user activity onto the space of the users,
determining relationship scores between each of the instances of the first user activity and each of the instances of the second user activity based on distances between the respective projections of the instances of the first user activity onto the space of the users and the respective projections of the instances of the second user activity onto the space of the users,
determining weighted sum scores for the instances of the first user activity, wherein each weighted sum score includes a product of a weight value and the relationship score corresponding to one or more of the instances of the second user activity, and each weight value is initialized to an initial value and adjusted to decrease with an increase in a number of instances of users performing the first user activity after performing the second user activity;
determining one of search results and content recommendations based at least on the weighted sum scores, and
causing the one of search results and content recommendations to be presented to a user.

21. A computer-implemented method comprising:
receiving data relating to occurrences of instances of a first and a second user activity, wherein each instance of the first user activity includes playing a media title from a set of media titles, and wherein each instance of the second user activity includes entering a distinct search query;
determining from the data, via one or more processors, projections of the instances of the first user activity onto a space of the users;
determining from the data projections of the instances of the second user activity onto the space of the users;
determining relationship scores between each of the instances of the first user activity and each of the instances of the second user activity based on distances between the respective projections of the instances of the first user activity onto the space of the users and the respective projections of the instances of the second user activity onto the space of the users;
correcting the relationship scores based on total numbers of plays of the respective media titles, wherein correcting the relationship scores includes dividing the relationship scores by $$\frac{1}{(\log\|S\|)^\gamma},$$

wherein $\|S\|$ are Euclidean norms of the projections of the plays of the respective media titles onto the space of the users, and wherein $\gamma$ is a constant;

determining one of search results and content recommendations based at least on the relationship scores; and causing the one of search results and content recommendations to be presented to a user.

22. The method of claim 21, further comprising:

aggregating, by user, plays of media titles;

aggregating, by user, search queries entered;

joining by user the aggregated plays of media titles and searches of queries;

determining dot products of the projections of plays of each of the media titles onto the space of the users with projections of searches of each of the queries onto the space of the users;

determining norms of each of the projections of plays of the media titles onto the space of the users and norms of each of the projections of searches of the queries onto the space of the users; and determining cosines of the angles between the projections of plays of each of the media titles onto the space of the users and the projections of searches of each of the queries onto the space of the users by dividing the respective dot products by the respective norms of projections for each pair of media title and search query pair.

23. The method of claim 21, wherein determining projections of searches of queries onto the space of the users excludes queries occurring when the respective media titles were unavailable for viewing by users.

24. The method of claim 21, wherein each instance of the first user activity includes playing a media title from a set of media titles for a period of time, and wherein each instance of the second user activity includes entering a distinct search query.

* * * * *